Aug. 28, 1962　　　　H. L. ELY　　　　3,051,340
VEHICLE HOIST
Filed Aug. 10, 1959　　　　　　　　　　2 Sheets-Sheet 1
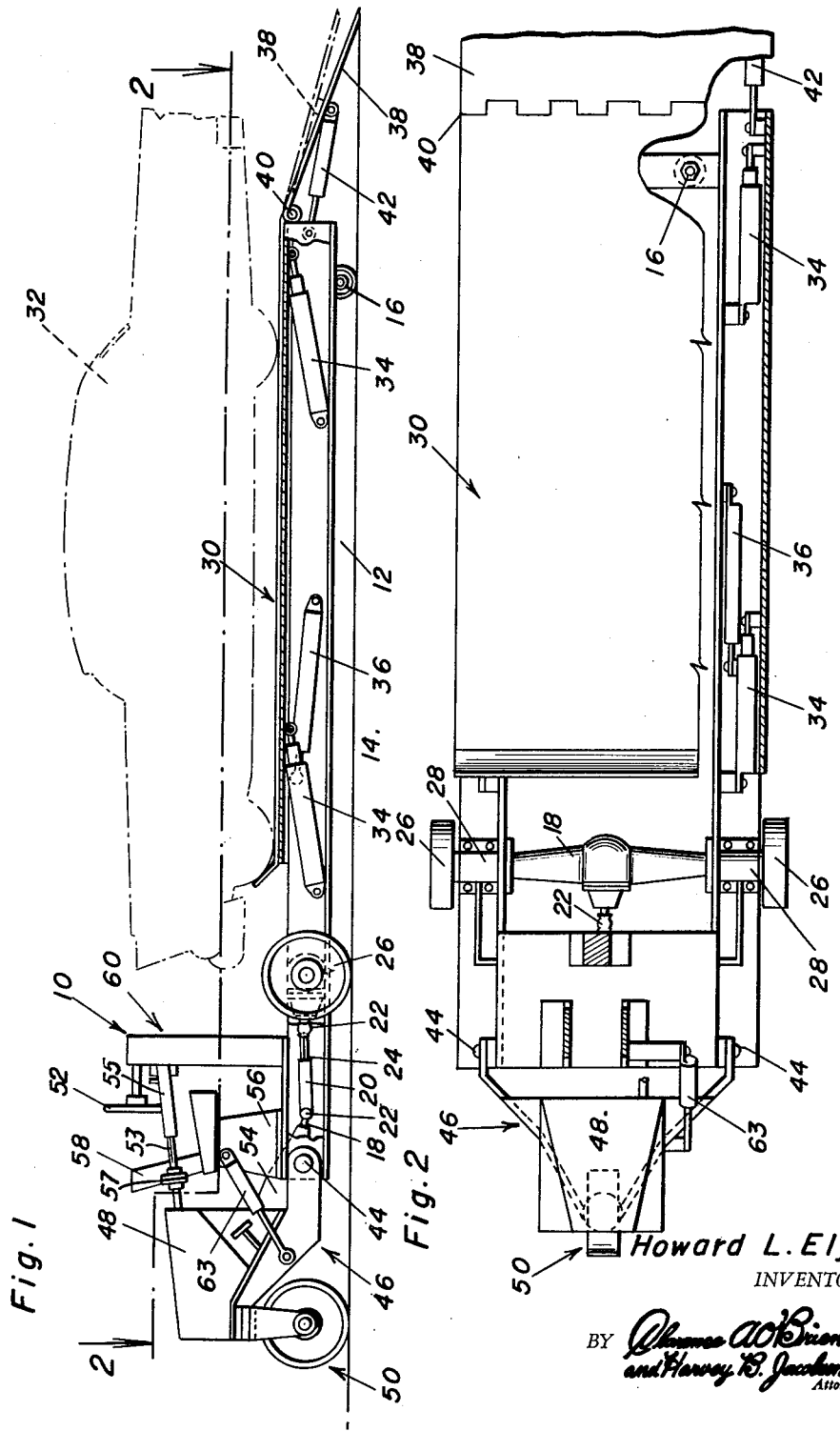
Howard L. Ely
INVENTOR.
BY *Thomas A. O'Brien*
*and Harvey B. Jacobson*
　　　　　Attorneys Aug. 28, 1962 H. L. ELY 3,051,340
VEHICLE HOIST
Filed Aug. 10, 1959 2 Sheets-Sheet 2

Howard L. Ely
INVENTOR.

BY *O'Brien*
*and Harvey B. Jacobson*
Attorneys

United States Patent Office 3,051,340
Patented Aug. 28, 1962

3,051,340
VEHICLE HOIST
Howard L. Ely, R.R. 1, Houston, Ohio
Filed Aug. 10, 1959, Ser. No. 832,795
6 Claims. (Cl. 214—512)

This invention relates to a novel and useful vehicle hoist and more particularly to a hoist having a platform thereon adapted to receive a motor vehicle, the hoist having means for raising and lowering the platform.

In large metropolitian areas there is an ever increasing demand for parking facilities and although as older dilapidated homes and buildings are being torn down and turned into parking lots to meet the increasing demand for parking spaces, it is becoming more apparent that single level parking lots, although increasing in number every day, are not sufficient to handle the increasing demand for parking spaces.

Many persons buying or renting the land on which buildings have been removed for the purpose of turning the land into a parking lot do not have sufficient capital for building the elaborate conventional form of parking buildings which have many floors on which to park vehicles. These parking buildings are actually quite expensive to erect and they do not utilize the entire area of each floor for the parking of vehicles since the customary ramps which are used to move vehicles from one floor to another require considerable area.

There have been many forms of parking buildings constructed in an attempt to more completely utilize the area of each floor for the purpose of parking vehicles. Some of the parking buildings are completely automatic having elevators for the purpose of transporting a vehicle from one floor to another while others have resorted to other methods.

The vehicle hoist comprising the present invention is designed for use with parking buildings having two or three floors in which the entire floor may be used for the purpose of parking vehicles, the vehicles being parked about the periphery of the floors. The distance between the floors of such a building is approximately 7 or 8 feet and the hoist comprising the present invention is designed specifically for raising and lowering the vehicles from the ground floor to the upper floor levels.

The invention encompasses a device on which a vehicle may be driven, the device having a platform for the purpose of supporting the vehicle and means for raising and lowering the platform with respect to the rest of the vehicle to the level of the desired floor.

The hoist itself is designed to be highly maneuverable enabling a parking lot attendant to move the hoist around the building to a point adjacent the desired vehicle. The platform is then raised to the level of the flooring on which the vehicle is supported and the vehicle is driven onto the platform whereupon the latter may be lowered and the hoist may be moved to a point where the vehicle carried thereby may be conveniently driven off the platform. Since the vehicle hoist would necessarily have to be highly maneuverable, it is provided with a Farmall type rear axle enabling either wheel on an end of the axle to be braked or to have power supplied thereto. To support the other end of the hoist there is provided caster wheels which are free to rotate in any direction.

It is the main object of this invention to provide a vehicle hoist having a platform on which a vehicle may be driven that may be raised and lowered to the desired floor level.

A further object, in accordance with the preceding object, is to provide a steering means for the vehicle hoist which will enable the latter to pivot about either one of two wheels to obtain the necessary maneuverability.

Yet another object, in accordance with the preceding objects, is to provide a means for steering the vehicle hoist independently of the wheels carried by the Farmall type rear axle so that the hoist may be conveniently moved from one location to another should it become necessary to move a hoist from one parking lot to another.

A final object to be specifically enumerated herein is to provide a vehicle hoist that will conform to conventional forms of manufacture, be easy to operate, and be durable in construction so as to provide an economically feasible and long lasting hoist operable by workmen having a minimum amount of mechanical knowledge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the vehicle hoist with parts thereof being broken away and shown in section to more clearly illustrate the details of construction;

FIGURE 2 is a longitudinal horizontal sectional view taken substantially upon the plane indicated by the section line 2—2 of FIGURE 1;

FIGURE 3 is a side elevational view of the vehicle hoist with the platform shown in an intermediate raised position and with the vehicle removed; and FIGURE 4 is a diagrammatic plan view of the hydraulic system of the hoist for raising and lowering the movable components thereof.

Referring now more specifically to the drawings, the numeral 10 generally designates the vehicle hoist comprising the present invention which includes a main frame 12 generally rectangular in shape and disposed horizontally with the supporting surface or ground 14. The main frame 12 has secured on the forward end a pair of caster wheel assemblies 16.

Carried by the rear portion of the main frame 12 is a Farmall type axle generally referred to by the reference numeral 18 which extends transversely of the frame 12 and is operatively connected to a power output shaft 18 by means of a drive shaft 20. The drive shaft 20 is provided with a pair of universal joints 22 and a splined joint at 24. It is to be understood that the Farmall axle 18 delivers power from the shaft 18 to the driving and braking wheels 26 which are operatively connected thereto. The Farmall axle 18 is also provided with a pair of braking mechanisms 28 each of which may be individually operated to brake the associated wheel 26 in order that the power transmitted to the other wheel 26 will pivot the main frame 12 about the braked wheel 26.

The main frame 12 is provided with a platform generally referred to by the reference numeral 30 which is adapted to receive a motor vehicle 32, see FIGURE 1. The platform 30 is also generally rectangular in shape and is secured to the main frame 12 by means of connecting links 34. A pair of connecting links 34 is disposed at each end of the main frame 12 with one end of each pivotally secured to the frame 12 and the other end pivotally secured to the corresponding end portion of the platform 30.

A power means in the form of a pair of extensible fluid motors 36 are provided for pivoting the connecting links 34 between a position substantially parallel with the platform 30 and the main frame 12 and an upstanding position at right angles to the platform 30 and the frame 12. The extensible fluid motors 36 are each disposed on one side of the frame 12 and has one end pivotally secured to the frame 12 and the other end pivotally secured to a connecting link 34 adjacent the platform 30.

Pivotally secured to the forward end of the platform 30 by means of hinge 40 is the rear end of a loading ramp 38 and there is provided an extensible motor 42 having one end secured to the platform 30 and the other end secured to the free end portion of the loading ramp 38 for the purpose of raising and lowering the platform as shown in FIGURE 1.

Pivotally secured to the rear end of the main frame 12 by means of pivot pin 44 is a second frame member generally referred to by the reference numeral 46. The second frame member 46 supports any conventional form of power supply (not shown) for operating the hoist 10 which is housed in a housing 48. Journaled in the free end portion of the second frame 46 is a dirigible wheel assembly 50 which is controlled by means of steering wheel 52. The steering wheel 52 is drivingly connected to a drive shaft having splined sections 53 and 55 in any convenient manner and the section 53 includes a universal joint 57. The section 55 is in turn drivingly connected to the dirigible wheel assembly 50 in any convenient manner for steering the latter. The power supply (not shown) is operatively connected to a transmission 54 having an output shaft 18.

The second frame 46 is provided with a seat standard 56 having a seat 58 secured to the upper portion thereof and also a control panel support generally referred to by the reference numeral 60 having a plurality of valves 62 thereon for the purpose of supplying fluid pressure from a fluid pump (not shown) to the extensible fluid motors 34, 36, 42 and 63, the latter having one end pivotally secured to the seat standard 56 and the other end pivtally secured to the second frame member 46 for raising and lowering the latter to engage or disengage the dirigible wheel assembly 50 with the supporting surface or ground.

Figures 3, 4:
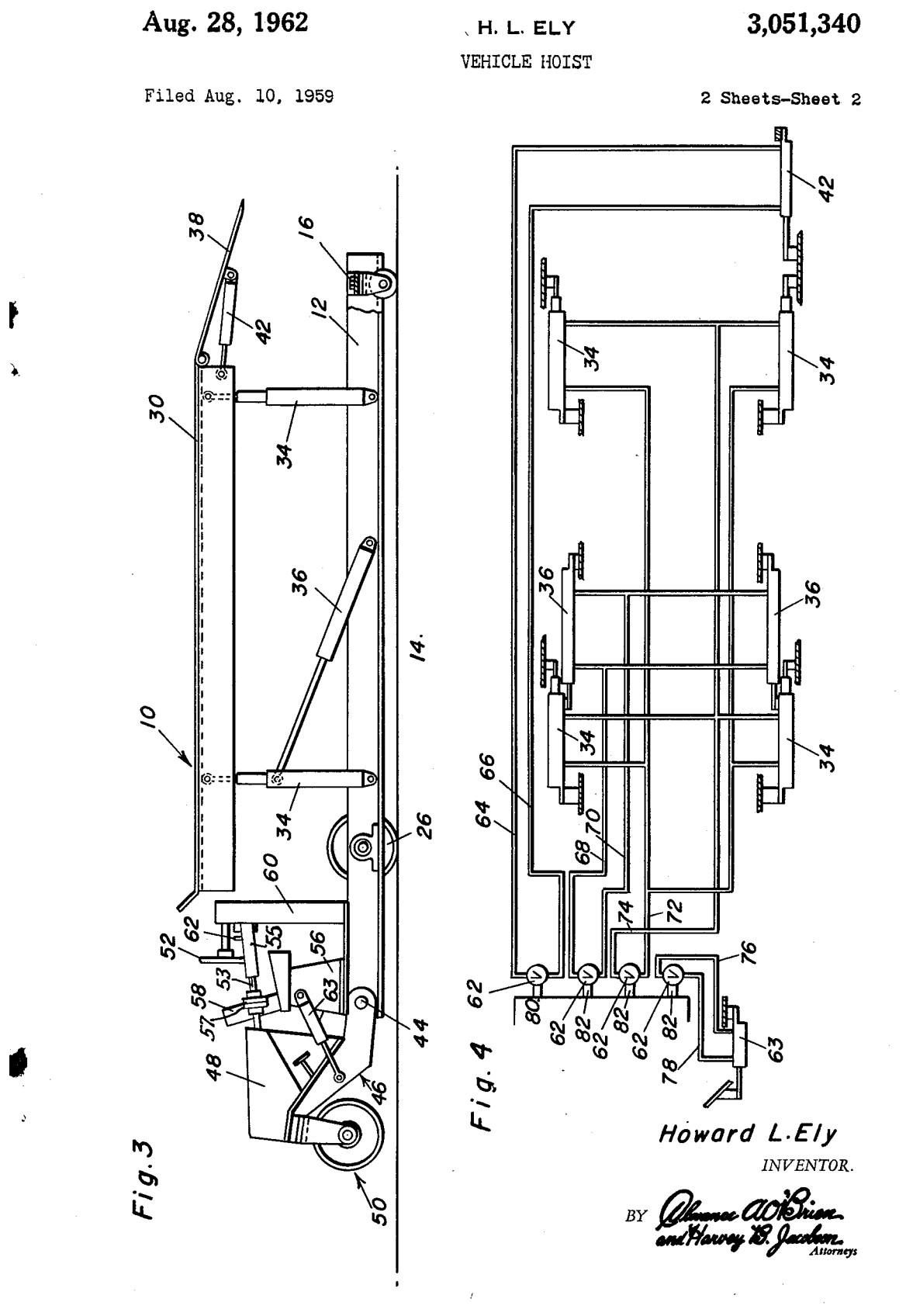

With attention now directed more particularly to FIGURE 4 of the drawings it will be seen that there is a valve 62 controlling inlet line 64 and outlet line 66 for the extensible motor 42, an inlet line 68 and outlet line 70 for the extensible motors 36, an inlet line 72 and an outlet line 74 for the extensible motors 34, and an inlet line 76 and outlet line 78 for the extensible motor 63. Each of the valves 62 is connected to a pressure manifold 80 by means of a conduit 82 in which there is stored under pressure a supply of hydraulic fluid.

It is to be understood that the hydraulic fluid is maintained under constant pressure by means of any suitable form of hydraulic pump (not shown) operatively connected to the power supply (not shown) in the housing 48.

It is to be further understood that any convenient means may be provided for the operation of the individual brake assemblies 28 and also that if desired, the inlet line 76 to the cylinder 63 may be provided with a pressure reservoir and a pressure regulator (not shown) so that the dirigible wheel assembly 50 may be yieldably urged into contact with the supporting surface 14 with a desired amount of force whereby the hoist 10 may be driven over an uneven supporting surface 14 with all five wheels remaining in contact with the supporting surface. As the wheel of the dirigible wheel assembly 50 is urged into contact with the supporting surface 14, the sections 53 and 55 are extended and the universal joint 57 will compensate for any change in angular relation of the sections 53 and 55 relative to the portion of the drive shaft disposed on the side of the universal joint 57 remote from the sections 53 and 55.

In operation, to place a vehicle 32 on an upper flooring of a parking building (not shown) the vehicle is positioned on the hoist 10 as shown in FIGURE 1 and the hoist is then moved to a position with the front end disposed in vertical alignment with the edge of the upper floors of the parking building. The fluid motors 36 are then actuated to raise the platform 30 above the frame 12 by pivoting the connecting links or fluid motors 34 to a vertical position as shown in FIGURE 3. It is to be understood that the fluid motors 36 in the extended position will elevate the platform 30 approximately seven or eight feet to the level of the second floor of the parking building. If it is desired to raise the vehicle 32 to the third floor of the building, the extensible fluid motors 34 are actuated. After the platform 30 has been positioned in alignment with the flooring of the desired floor, the vehicle 32 may be driven from the hoist 10 onto the floor of the parking building. It is to be understood that most conveniently the ramp 38 may be raised or lowered to make any final adjustment in the height of the platform 30. It is further to be understood that in most cases the free end of the ramp 38 will rest upon the upper surface of the floor on which the vehicle is to be placed.

When it is desired to remove a vehicle from either the second or third floor of the parking building, the process is of course reversed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hoist comprising an elongated main frame, a pair of caster wheels mounted on and supporting the forward end of said frame, a pair of laterally spaced driving and braking wheels journaled for rotation about axes fixed relative to said frame and supporting the other end of said frame, power and braking means independently operatively connected to each of said last mentioned wheels, a platform carried by said frame adapted to support a load, and means for raising and lowering said platform, a second frame member having one end pivotally secured to the rear end of said main frame and a dirigible wheel carried by the other end adapted to engage the supporting surface of said hoist, means for raising and lowering said other end of said second frame.

2. The combination of claim 1 in cluding a ramp having one end pivotally secured to the forward end of said plaform, and means for raising and lowering said ramp.

3. The combination of claim 1 including a pair of connector links pivotally secured between each end of said main frame and the corresponding end of said platform, and means for pivoting said links between a position substantially parallel with said main frame and said platform and a position extending at right angles thereto to raise and lower said platform.

4. The combination of claim 3 wherein each of said links is extensible in length, and means for extending said links.

5. A vehicle hoist comprising an elongated main frame, a pair of caster wheels mounted on and supporting the forward end of said frame, a pair of laterally spaced driving and braking wheels journaled for rotation about axes fixed relative to said frame and supporting the other end of said frame, power and braking means independently operatively connected to each of said last mentioned wheels, a platform carried by said frame adapted to support a motor vehicle, means for raising and lowering said platform, a ramp having one end pivotally secured to the forward end of said platform, means for raising and lowering said ramp, a second frame member having one end pivotally secured to the rear end of said main frame and a dirigible wheel carried by the other end adapted to engage the supporting surface of said hoist, and means for raising and lowering said other end of said second frame.

6. A vehicle hoist comprising an elongated main frame, a pair of caster wheels mounted on and supporting the forward end of said frame, a pair of laterally spaced driving and braking wheels journaled for rotation about axes fixed relative to said frame and supporting the other end of said frame, power and braking means independently operatively connected to each of said last mentioned wheels, a platform carried by said frame adapted to support a motor vehicle, means for raising and lowering said platform, a ramp having one end pivotally secured to the forward end of said platform, means for raising and lowering said ramp, a second frame member having one end pivotally secured to the rear end of said main frame and a dirigible wheel carried by the other end adapted to engage the supporting surface of said hoist, means for raising and lowering said other end of said second frame, a pair of connector links pivotally secured between each end of said main frame and the corresponding end of said platform, and means for pivoting said links between a position substantially parallel with said main frame and said platform and a position extending at right angles thereto to raise and lower said platform.

References Cited in the file of this patent

UNITED STATES PATENTS

| | | |
|---|---|---|
| 1,452,300 | Lightner et al. | Apr. 17, 1923 |
| 2,412,158 | Kuehlman et al. | Dec. 3, 1946 |
| 2,505,832 | Lange | May 2, 1950 |
| 2,891,331 | Pleska | June 23, 1959 |
| 2,900,094 | Ferguson | Aug. 18, 1959 |
| 2,922,482 | Fisher | Jan. 26, 1960 |
| 2,936,039 | Rockwell | May 10, 1960 |

FOREIGN PATENTS

| | | |
|---|---|---|
| 657,995 | Great Britain | Oct. 3, 1951 |